US011163574B2

(12) United States Patent
Gellerich et al.

(10) Patent No.: US 11,163,574 B2
(45) Date of Patent: *Nov. 2, 2021

(54) METHOD FOR MAINTAINING A BRANCH PREDICTION HISTORY TABLE

(71) Applicant: International Business Machines Corporation, Armonk, NY (US)

(72) Inventors: Wolfgang Gellerich, Boeblingen (DE); Peter M. Held, Renningen (DE); Martin Schwidefsky, Boeblingen (DE); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/527,244

(22) Filed: Jul. 31, 2019

(65) Prior Publication Data

US 2019/0354372 A1 Nov. 21, 2019

Related U.S. Application Data

(63) Continuation of application No. 15/065,911, filed on Mar. 10, 2016, now Pat. No. 10,430,194, which is a
(Continued)

(51) Int. Cl.
*G06F 9/38* (2018.01)
*G06F 9/30* (2018.01)
(Continued)

(52) U.S. Cl.
CPC .......... *G06F 9/3806* (2013.01); *G06F 9/3004* (2013.01); *G06F 9/3851* (2013.01); *G06F 9/461* (2013.01); *G06F 9/4881* (2013.01)

(58) Field of Classification Search
CPC .... G06F 9/3844; G06F 9/3806; G06F 9/3851; G06F 9/461; G06F 9/30123
(Continued)

(56) References Cited

U.S. PATENT DOCUMENTS 5,894,569 A 4/1999 Arimilli et al.
6,108,775 A 8/2000 Shiell et al.
(Continued)

FOREIGN PATENT DOCUMENTS

EP 1810130 B1 11/2011
JP 2005520222 A 7/2005

OTHER PUBLICATIONS

Chen et al.; "Process Switches and Branch Prediction Accuracy"; Dept. of Electrical and Computer Engineering, Rice University; Retrieved Online from http://www.owlnet.rice.edu/~elec525/projects/pbp_report.pdf on Nov. 30, 2015; pp. 1-9.
(Continued)

*Primary Examiner* — Shawn Doman
(74) *Attorney, Agent, or Firm* — Cantor Colburn LLP; Margaret McNamara (57) ABSTRACT

A method for managing tasks in a computer system comprising a processor and a memory, the method includes performing a first task by the processor, the first task comprising task-relating branch instructions and task-independent branch instructions and executing the branch prediction method, the execution resulting in task-relating branch prediction data in the branch prediction history table. In response to determining that the first task is to be interrupted or terminated, the method includes storing the task-relating branch prediction data of the first task in the task structure of the first task. In response to determining that a second task is to be continued, the method includes reading task-relating branch prediction data of the second
(Continued)

task from the task structure of the second task and storing the task-relating branch prediction data of the second task in the branch prediction history table.

20 Claims, 6 Drawing Sheets

Related U.S. Application Data continuation of application No. 14/953,633, filed on Nov. 30, 2015, now Pat. No. 10,423,418.

(51) Int. Cl.
*G06F 9/46* (2006.01)
*G06F 9/48* (2006.01)

(58) Field of Classification Search
USPC .................................. 712/240, 228; 718/108
See application file for complete search history.

(56) References Cited

U.S. PATENT DOCUMENTS

| | | | |
|---|---|---|---|
| 6,360,220 B1 | 3/2002 | Forin |
| 6,367,071 B1 | 4/2002 | Cao et al. |
| 6,598,152 B1 | 7/2003 | Sinharoy |
| 6,715,064 B1 | 3/2004 | D'Sa et al. |
| 7,328,332 B2 | 2/2008 | Tran |
| 7,549,022 B2 | 6/2009 | Baker |
| 7,634,642 B2 | 12/2009 | Hochschild et al. |
| 7,647,452 B1 | 1/2010 | Moll et al. |
| 7,844,973 B1 | 11/2010 | Dice |
| 8,020,169 B2 | 9/2011 | Yamasaki |
| 8,131,982 B2 | 3/2012 | Emma et al. |
| 8,141,098 B2 | 3/2012 | Bradford et al. |
| 8,261,049 B1 | 9/2012 | Kang et al. |
| 8,347,309 B2 | 1/2013 | Smolens et al. |
| 8,473,727 B2 | 6/2013 | Dunn et al. |
| 8,539,212 B1 | 9/2013 | Kang et al. |
| 8,990,506 B2 | 3/2015 | Cherukuri et al. |
| 9,069,675 B2 | 6/2015 | Greiner et al. |
| 2003/0023663 A1 | 1/2003 | Thompson et al. |
| 2004/0088525 A1 | 5/2004 | D'Sa et al. |
| 2005/0114637 A1 | 5/2005 | John et al. |
| 2006/0095750 A1 | 5/2006 | Nye et al. |
| 2006/0212658 A1 | 9/2006 | Hrle et al. |
| 2008/0052499 A1 | 2/2008 | Koc |
| 2009/0313462 A1 | 12/2009 | Emma et al. |
| 2011/0145473 A1 | 6/2011 | Maheshwari |
| 2011/0219190 A1 | 9/2011 | Ng et al. |
| 2011/0264843 A1 | 10/2011 | Haines et al. |
| 2012/0254837 A1 | 10/2012 | Frazier et al. |
| 2013/0191825 A1 | 7/2013 | Muff et al. |
| 2013/0339691 A1 | 12/2013 | Bonanno et al. |
| 2013/0339697 A1 | 12/2013 | Bonanno et al. |
| 2014/0095849 A1 | 4/2014 | Xekalakis et al. |
| 2014/0223107 A1 | 8/2014 | Sadok et al. |
| 2014/0258629 A1 | 9/2014 | Busaba et al. |
| 2014/0289731 A1 | 9/2014 | Wei |
| 2015/0039870 A1 | 2/2015 | Scott et al. |
| 2016/0055095 A1 | 2/2016 | Faraboschi et al. |
| 2017/0153893 A1 | 6/2017 | Gellerich et al. |
| 2017/0153895 A1 | 6/2017 | Gellerich et al. |
| 2018/0081813 A1 | 3/2018 | Gellerich et al. |
| 2018/0081814 A1 | 3/2018 | Gellerich et al. |
| 2018/0150413 A1 | 5/2018 | Parker et al. |

OTHER PUBLICATIONS

Daly et al.; "Cache Restgoration for Highly Partitioned Virtualized Systems"; IEEE No. 978-1-4673-0826; 2011; 10 Pages.
List of IBM Patents or Patent Applications Treated As Related; Date Filed: Jul. 31, 2019, 2 pages.

Restore Branch Prediction Data

| OPCODE | R1 | R2 | B4 | D4 | M3 | /// | OPCODE |
|---|---|---|---|---|---|---|---|
| 0 | 8 | 12 | 16 | 20 | 32 | 36 | 40  47 |

Store Branch Prediction Data

| OPCODE | R1 | R2 | B4 | D4 | M3 | /// | OPCODE |
|---|---|---|---|---|---|---|---|
| 0 | 8 | 12 | 16 | 20 | 32 | 36 | 40  47 |

Fig. 6

METHOD FOR MAINTAINING A BRANCH PREDICTION HISTORY TABLE

DOMESTIC PRIORITY

This application is a continuation of the legally related U.S. application Ser. No. 15/065,911 filed Mar. 10, 2016, which is a continuation of the legally related U.S. application Ser. No. 14/953,633 filed Nov. 30, 2015, which is fully incorporated herein by reference.

BACKGROUND

The present invention relates to a method for managing tasks in a computer system. Furthermore, the invention relates to a computer system configured for a method for managing tasks in a computer system.

Customers expect performance improvements for every new computer model. In the past, advances in solid state physics allowed increasing clock frequency from about 1 MHz around 1980 to several GHz today. However, currently, improvements of solid state physics become more difficult. Increased speed of program execution may thus come from improved CPU structure.

Normally, the machine instructions of a binary computer program are executed one after each other. The instructions are fetched and pipelined by an instruction fetch unit and executed by an execution unit. Branch instructions may interrupt the sequential execution and redirect program execution to somewhere else. Branch instructions are used to implement high-level program constructs as well as all kinds of loops. On some CPUs branch instructions are also used to implement subprogram calls. Several systems provide instructions tailored towards the implementation of counting loops. These branch instructions form a loop and consider a given counter as loop counter, increment or decrement this counter, and branch depending on whether the new counter value reached a reference value.

The overlapping, pipelined execution of instruction as used by many processors complicates the execution of branch statements. The address of the next instruction to execute is only known after the branch instruction has completed. However, at the point where the execution of a branch instruction is complete, the instruction fetch unit has already begun to fetch and pipeline instructions following the branch instruction. Depending if the branch is taken or not, the pipeline needs to execute different instructions, starting at the target address of the branch. This, however, requires a new pipeline start at the target address, thus delaying program execution.

It is therefore state of the art that processors comprise a branch prediction unit for doing some kind of branch prediction, based on recorded information about some branch instruction's behavior in the past. Common to all approaches for branch prediction is the need to store information about the past behavior of the instructions to be executed. The processor provides memory for this purpose, in the following called branch prediction history table.

When the execution of a program starts, branch prediction first needs to learn about the branches used in the code. Information stored usually includes the branch instruction's address or some hash value derived from this address, whether the branch was taken or not, what the branch instruction's target address was, and depending on the prediction algorithm also some additional information e.g. about the path leading to the branch instruction.

Branch instruction does not only need to learn when the user starts a new application program but also whenever the operating system performs a context switch by assigning the physical processor to a different operating-system-level process, or when the hypervisor assigns the physical processor to a different virtual machine. The branch prediction unit typically has a fixed amount of memory for the branch prediction history table within the processor to store information. The branch prediction unit fills the memory as the execution of the current binary proceeds. After a switch to another task, the memory is filled with information belonging to the previous binary which does not lead to correctly predicted branches in the new task. Thus, the branch prediction unit starts to relearn the branches of the task after a task switch, implying that the rate of mispredicted branches will be high which reduces execution speed.

Therefore, when a task switch is performed, the branch prediction history table of the currently executed task is saved into a task structure of this task. If a task is to be continued or started, the processor can restore the data of this task, respectively the branch prediction history table of this task. However, the size of the branch prediction history table may become very large. The saving process may reduce the performance of the processor.

SUMMARY

A computer system having a processor and a memory is disclosed. The processor is configured for executing tasks, where the tasks comprise task-relating branch instructions and task-independent branch instructions. The processor is configured for executing a branch prediction method for predicting the behavior of the task-relating branch instructions and the task-independent branch instructions and determining branch prediction data for the task-relating branch instructions and the task-independent branch instructions. The processor includes a control register for controlling the tasks to be executed and a branch prediction history table for storing branch prediction data determined with the branch prediction method. The memory includes a memory area for storing a task structure of each of the tasks, the task structure being configured for storing branch prediction data.

The processor is configured to identify the task-independent branch instructions by identifying the task-independent branch instructions as being tagged with a processor state indicating user or privileged mode or by identifying an address range of the task-independent branch instructions as the address range of standard libraries, wherein the task-independent branch instructions produce task-independent branch prediction data. The processor performs a first task by the processor, the first task including task-relating branch instructions and the task-independent branch instructions.

The processor executes the branch prediction method, resulting in branch prediction data, including the task-independent branch prediction data produced by the task independent branch instructions in the branch prediction history table. In response to determining that the first task is to be interrupted or terminated, the processor stores task-relating branch prediction data of the first task in the task structure of the first task.

In response to determining that a second task is to be continued or started, the processor reads task-relating branch prediction data of the second task from the task structure of the second task, store the task-relating branch prediction data of the second task in the branch prediction history table, and ensure that the task-independent branch prediction data produced by the task-independent branch instructions is maintained in the branch prediction history table.

BRIEF DESCRIPTION OF THE DRAWINGS

In the following embodiments of the invention are explained in greater detail, by way of example only, making reference to the drawings in which.

DETAILED DESCRIPTION

Embodiments of the invention may have the advantage that the data traffic between the processor and the memory is reduced. The invention may reduce data traffic of the computer system and improves the performance of the computer system. Some code is shared between tasks, i.e. the operating system itself or some standard libraries. The data of these codes in branch prediction history table need not to be saved and restored. It is only necessary to save and restore branch prediction data which belong to the specific task. A further observation is that these task-relating branch prediction data, in general, fill only a small part of the table.

Branches usually can be identified by their address or a value calculated thereof. In order to identify and to store only task-related branch prediction data, this identification may be extended so that the branch can by assigned to a task, for example with a process-ID or a hash-value calculated from this number. To distinguish branch prediction data referring to the operation system binary, the data may also be tagged with a processor's state indicating user or privileged mode. The binaries belonging to the standard libraries may be identified by their address range they are stored in.

This may have the advantage that only branch prediction data belonging to the respective tasks are stored respectively restored. Since the data to be stored by the processor is reduced, the performance of the processor may be improved. In response to determining that the second task is to be continued or started, task-relating data of the second task may be read from the task structure of the second task by the processor. The task-relating data may comprise information whether the task structure comprises task-relating branch prediction data. Only in case that the task-relating data comprises information that the structure comprises task-relating branch prediction data reading of the task-relating branch prediction data is performed.

This may have the advantage that the restoring process may only be started in case task-relating branch prediction data of the second task are stored in the task structure of the second task. In case a task is to be interrupted or terminated, other task-relating data than the branch prediction data may be stored in order to make this data available when the task is continued or started. This may improve the starting or continuation of the task. The task-relating data may comprise information whether task-relating branch prediction data are stored when the task was interrupted or terminated. By reading this data, it is possible to determine if a restoring process for task-relating branch prediction data has to be started.

In response to determining that the first task is to be interrupted or terminated, the task-relating data of the first task may be stored in the task structure of the first task. The task-relating data may comprise information that the task structure comprises task-relating branch prediction data. In order to retrieve the task-relating data in case the task is to be continued or started, the task-relating data of the first process has to be stored in case it is determined that the task is to be interrupted or terminated.

After storing the task-relating branch prediction data of the first task, the method may further comprise providing a marking to the task-relating branch prediction data or the task-independent branch prediction data in the branch prediction history table. The marking permits to identify the task-independent branch prediction data that is to be maintained in the branch prediction history table. It has to be noted here that a marking with respect to "the identification of the task-independent branch prediction data that is to be maintained in the branch prediction history table" is to be understood in the context of the storing of the task-relating branch prediction data of the second task in the branch prediction history table: the marking ensures that upon the storing of the task-relating branch prediction data of the second task in the branch prediction history table, the task-independent branch prediction data is maintained in the branch prediction history table, i.e. this task-independent branch prediction data is exempt here for a replacement with the task-relating branch prediction data of the second task.

Due to the fact that the size of the branch prediction history table is limited, new branch prediction data has to replace older branch prediction data in the branch prediction history table in case that the memory space of the branch prediction history table is full. In order to prevent that task-independent branch prediction data, e.g. data of the operation system or standard libraries, is replaced with task-relating branch prediction data of the second task, these data are marked accordingly. The newly added or restored branch prediction data are only allowed to replace data which are not marked accordingly. Thus, executing task-independent tasks is not interrupted due to missing data.

The storing of the task-relating branch prediction data of the second task may comprise identifying task-relating branch prediction data in the branch prediction history table and replacing the identified task-relating branch prediction data of the branch prediction history with all or part of the task-relating branch prediction data of the second task. The identifying is performed using the marking.

The method may further comprise determining whether sufficient bandwidth is available for storing the task-relating branch prediction data of the first task in the task structure. The task-relating branch prediction data may only be stored in the task structure of the first task in case sufficient bandwidth is available and a notice may be stored in the task structure that no task-relating branch prediction data are stored of the first task in case no sufficient bandwidth is available. This may have the advantage that currently processed task are not compromised by storing processes. Storing branch prediction data is only executed in case sufficient bandwidth is available.

In case that no sufficient bandwidth for storing the task-relating branch prediction data is available, task-relating branch prediction data belonging to conditional branch instructions or unconditional branch instructions may be determined and it may be determined whether sufficient bandwidth is available for storing the task-relating branch prediction data of the conditional branch instructions or the unconditional branch instructions. Only the task-relating branch prediction data of the conditional branch instructions or of the unconditional branch instructions may be stored in case sufficient bandwidth is available for storing task-relating branch prediction data of the conditional branch instructions or unconditional branch instructions.

This may have the advantage, that the task-relating branch prediction data of the conditional or the unconditional branch instructions may be stored in case sufficient bandwidth is available. Furthermore, it may be determined whether sufficient bandwidth is available for reading the task-relating branch prediction data of the second task from the task structure. The reading of the task-relating branch prediction data may be only performed in case sufficient bandwidth is available. The reading of the task-relating branch prediction data may be terminated in case no sufficient bandwidth is available.

Figure 1:
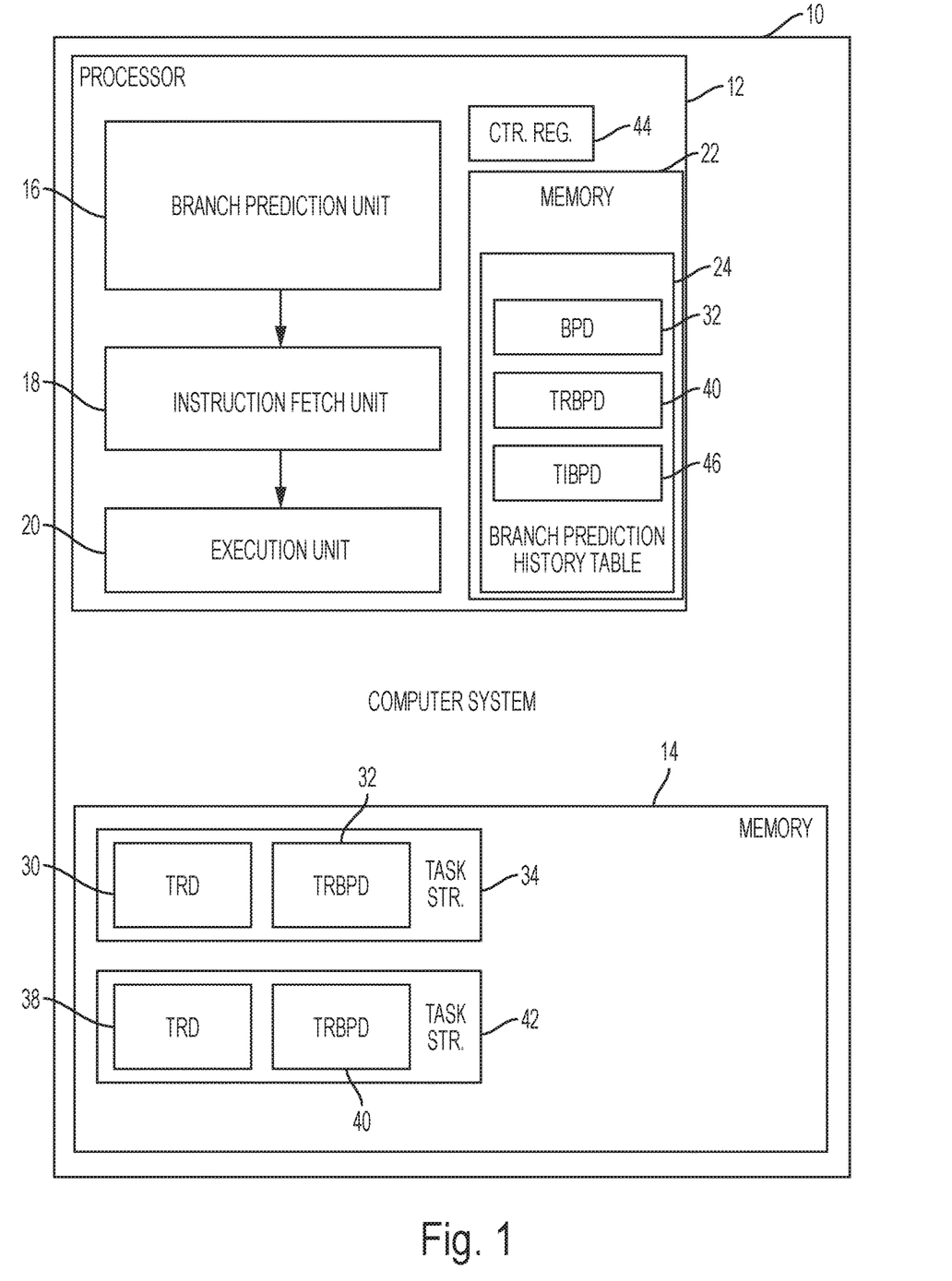
FIG. 1 shows a schematic view of the computer system and the flow of information between the components of the computer system.

The branch prediction unit may execute the branch prediction method asynchronous to the execution of the task. Hereinafter, a computer system 10 comprising a processor 12 and a memory 14 as well as a method for managing tasks in this computer system 10 are described. Referring to FIG. 1, the processor 12 comprises a branch prediction unit 16, an instruction fetch unit 18 and an execution unit 20. The execution unit 20 is configured to execute instruction of a binary computer program.

The instructions of tasks to be executed by the processor are fetched and pipelined by the instruction fetch unit 18. The instructions are stored in a memory 22 of the processor 10, which is not shown in details. After fetching and pipelining the instruction, the instructions may be decoded, edited or prepared for the execution unit 20 by several other components, which are not shown in details.

Normally, the fetched and pipelined instructions of the tasks are executed one after each other. Branch instructions may interrupt these sequential executions and redirect program execution to somewhere else. The overlapping, pipelined execution of instruction as used by many processors complicates the execution of branch statements. The address of the next instruction to execute is only known after the branch instruction has completed. However, at the point where the execution of a branch instruction is complete, the instruction fetch unit has already begun fetching and pipelining instructions following the branch instruction.

Therefore, the branch prediction unit 16 is provided for predicting the target address of the branch instruction. Depending on the result of the prediction, the instruction fetch unit fetches and pipelines the next instruction to be executed by the execution unit. The branch prediction unit 16 works asynchronously to normal program execution of the instruction fetch unit 18 and the execution unit 20. It identifies and predicts future branches independently. Therefore, fetching and pipelining the next instruction has started before the execution information of the previous instruction is received by the branch prediction unit in order to avoid delaying or idling and to improve the performance of the processor. A branch prediction history table 24 is provided in the memory 22 of the processor 12. Branch prediction data of previously or currently executed tasks generated by the branch prediction unit are stored in the branch prediction history table 24. This data may be used in case the branch instruction is executed repeatedly.

Figure 2:
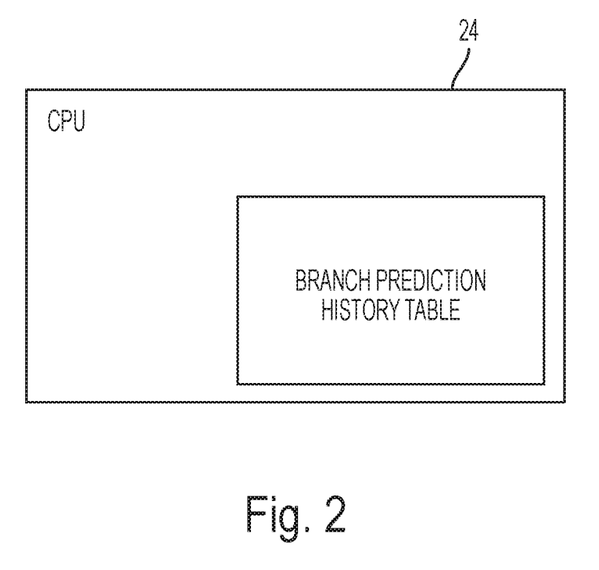
FIG. 2 shows a process diagram of a method for managing tasks in a computer system according to FIG. 1.

As can be seen in FIG. 2, the branch prediction history table 24 comprises task-relating branch prediction data 32 and task-independent branch prediction data 46. The branch independent branch prediction data 46 may belong to the operation system or standard libraries which are used by all tasks. The branch prediction data are identifiable by the address of the branch or a value calculated thereof and a process-ID or a hash-value calculated from this number. Therefore it is possible to identify to which task a branch prediction data belongs. To distinguish branch prediction data referring to the operation system binary, the data may also be tagged with a processor's state indicating user or privileged mode. The binaries belonging to the standard libraries may be identified by their address range they are stored in.

However, the memory space of the branch prediction history table 24 is limited. In order to store the branch prediction data of a currently executed task which has to be terminated or interrupted, a task structure 34, 42 is provided in the memory 14 for each task. The task structure 34, 42 stores task-relating data of the respective task in order to facilitate continuation or starting this task. Furthermore, task-relating branch prediction data are stored in the task structure in order to improve branch prediction for this task when starting or continuing this task.

In case it is determined that a first task 28 which is currently executed by the processor 12 is to be interrupted or terminated and a second task 36 is to be continued or started by the processor 12, the task-relating data 30 and the task-relating branch prediction data 32 of the first task 28 are stored into the task structure 34 of the first task. This data may be used when the first task is continued or started. After storing the task-relating data 30 and the task-relating branch prediction data 32 of the first task 34, the task-relating data 38 and the task-relating branch prediction data 40 of the second task are restored from the task structure 42 of the second task.

Figure 3:
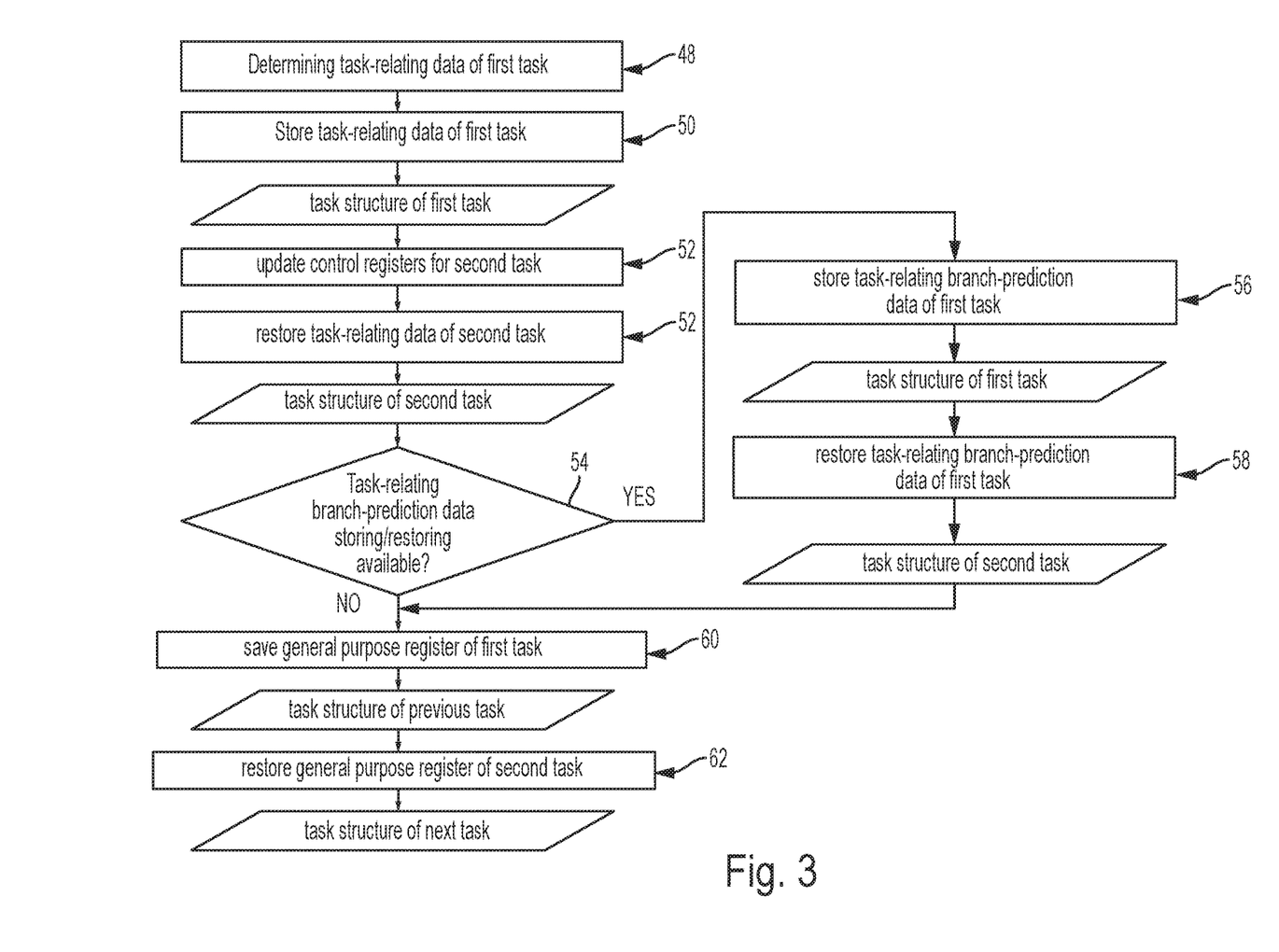
FIG. 3 shows a general structure of a method for managing tasks in a computer system according to FIG. 1.

The method of storing the task-relating data 30 and the task-relating branch prediction data 32 of the first task and restoring the task-relating data 38 and the task-relating branch prediction data 40 of the second task is described with reference to FIGS. 2 and 3. In a first step 48, the control register 44 of the processor 12 determines that a first task which is currently executed is to be terminated or interrupted and that a second task is to be started or continued.

After determining that the first task is to be terminated or interrupted, task-relating data 30 of the first task are stored in the task structure 34 of the first task (reference sign 50). The task-relating data 30 may comprise access, floating point control and floating point registers of the first task. The task-relating data 30 of the first task may further comprise information whether the first task comprises task-relating branch prediction data 32.

Afterwards, the control register 44 is updated for the second task by restoring task-relating data 38 of the second task from the task structure 42 of the second task, e.g. access, floating point control and floating point registers of the second task 36 (reference sign 52). The task-relating data 38 of the second task may further comprise information whether the second task comprises task-relating branch prediction data 40.

Next, the control register 44 determines whether the first task comprises task-relating branch prediction data 32 to be stored in the task structure 34 of the first task and whether the task structure 42 of the second task comprises task-relating branch prediction data 40 of the second task to be restored to the branch prediction history table 24 of the processor 12 (reference sign 54). This determination may be executed in parallel to storing and restoring the task-relating data 30 of the first task respectively the second task or afterwards in separate steps.

In case that the first task comprises task-relating branch prediction data 32 to be stored, the task-relating branch prediction data 32 of the first task 28 are stored to the task structure 34 of the first task 28 (reference sign 56). Afterwards further task-relating data of the first task 28 may be stored and the first task may be interrupted or terminated (Reference sign 60).

In case that the task structure 42 of the second task comprises task-relating branch prediction data 40 of the second task, the task-relating branch prediction data 40 of the second task 36 are restored from the task structure 42 of the second task (reference sign 58) and the second task is started or continued. Additionally, further task-relating data may be restored from the task structure 42 (reference sign 62).

The size of the memory of the branch prediction history table 24 is limited. Depending on the number of tasks to be executed by the processor 12, this memory space is not sufficient to store the branch prediction data of all tasks. Therefore, for restoring the branch prediction data 40 of the second task, older branch prediction data has to be replaced. In order not to replace task-independent branch prediction data 46, a marking is provided for the branch prediction data which permits to identify the task-independent branch prediction data 46 such that for the purpose of restoring the branch prediction data 40 of the second task, this task-independent branch prediction data 46 is maintained in the history table 24 This marking may comprise the process-ID of the task.

Figure 4:
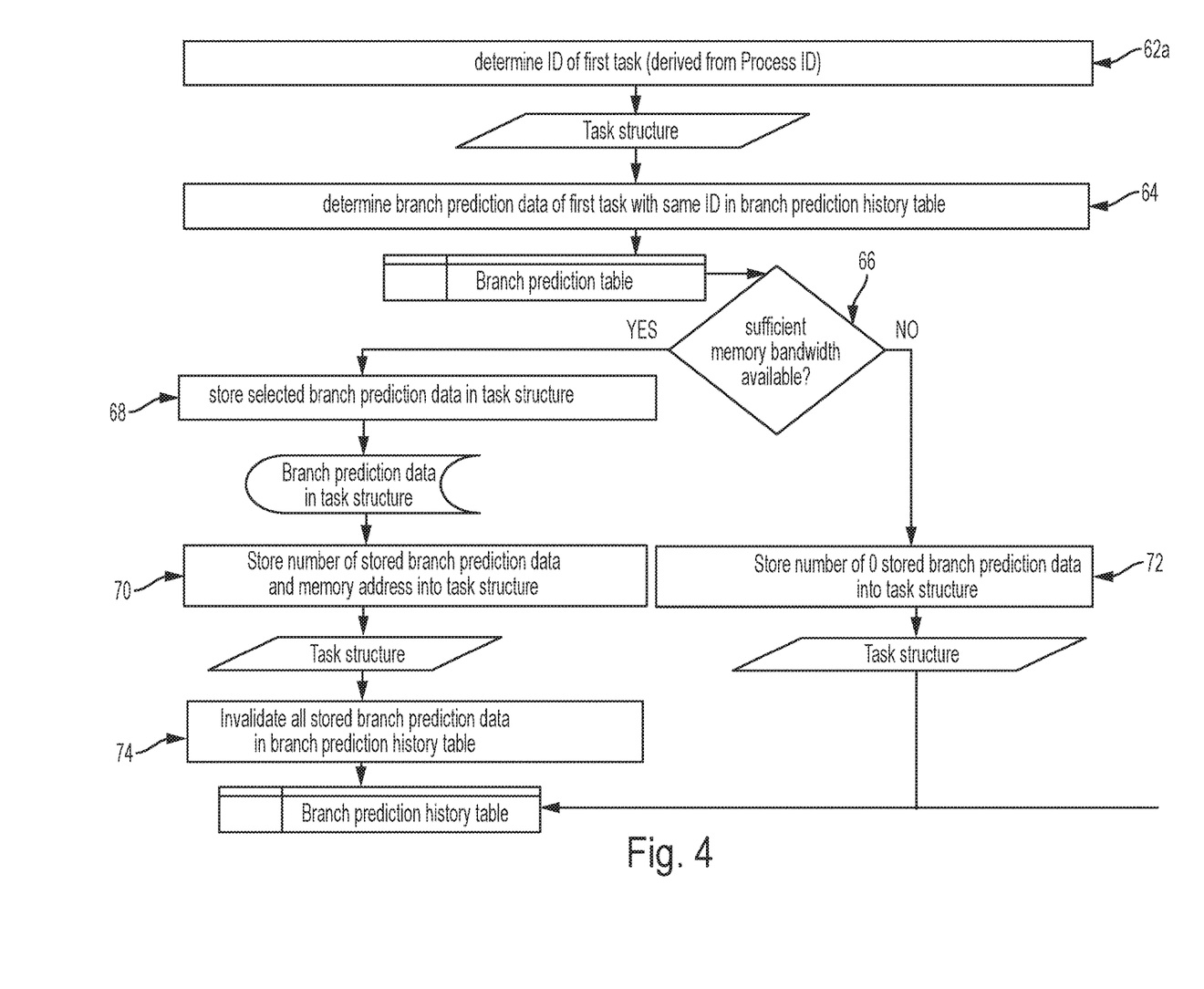
FIG. 4 shows a process diagram of the storing process of task-relating branch prediction data in a method according to FIG. 3.

Referring now to FIG. 4, the storing process of the branch prediction data is described. First, the first task is identified, for example by the process-ID of the first task (reference sign 62A). The process-ID may be received from the control register 44 or from the task structure 34 of the first task. Next, the branch prediction data 32 which belongs to the first task are identified (reference sign 64). Since the process-Id is part of the ID of the task-relating branch prediction data 32, these data are easy to identify. If the task-relating branch prediction data 32 are identified, it is determined whether sufficient bandwidth is available for storing these task-relating branch prediction data 32 (reference sign 66). Since the focus of the computer system 10 and the processor 12 is on executing the tasks, storing of the task-relating branch prediction data 32 of the first task is only executed if sufficient bandwidth is available not to compromise the executing of the task.

If sufficient bandwidth is available, the task-relating branch prediction data 32 of the first task are stored into the task structure 34 of the first task (reference sign 68). After storing the task-relating branch prediction data 32 of the first task, a marking may be set to the data of the task-relating branch prediction data 32 of the first task in the branch prediction history table 24 which marks this data replaceable by new task-relating branch prediction data. Alternatively, only the task-independent branch prediction data 46 are marked as not being replaceable by new task-relating branch prediction data. In this embodiment, branch prediction data in the branch prediction history table 24 without a marking is accordingly replaceable. The number of stored task-relating branch prediction data 32 of the first task is stored into the task structure 34 of the first task (reference sign 70). In case the first task 32 is continued or started, this number may be used for determining whether task-relating branch prediction data 32 of the first task are stored and for determining the required bandwidth for restoring this data.

If no sufficient bandwidth is available for storing all task-relating branch prediction data 32, it is determined whether the task-relating branch prediction data 32 belong to conditional or unconditional branch instructions. Next, it is determined whether sufficient bandwidth is available for storing the task-relating branch prediction data of the conditional branch instructions. If this condition is fulfilled, only these branch prediction data are stored. Furthermore, a notice may be stored that no branch prediction data for unconditional branch instructions are stored.

In case no sufficient bandwidth for storing task-relating branch prediction data 32 is available, no branch prediction data 32 are stored into the task structure 34 of the first task but a notice that no branch prediction data are stored (reference sign 72). For example, the notice is that the number of stored task-relating branch prediction 32 data of the first task 28 is zero. Finally, task-relating branch prediction data stored in the branch prediction history table 24 are invalidated for example by marking the task-relating branch prediction data (reference sign (74).

Figure 5:
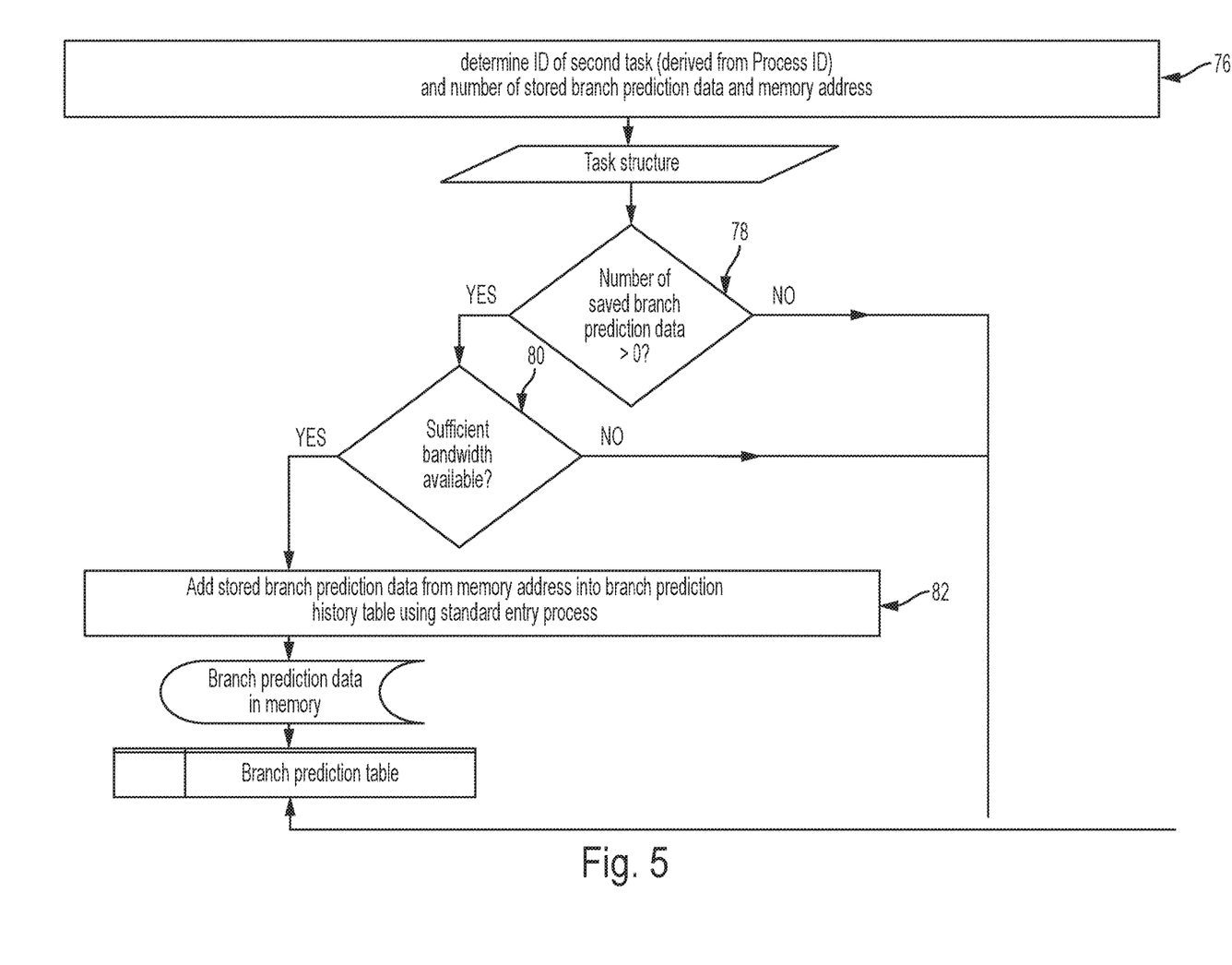
FIG. 5 shows a process diagram of the restoring process of task-relating branch prediction data in a method according to FIG. 3.

Referring now to FIG. 5, the restoring process of the branch prediction data 40 of the second task 36 is described. First, the task-ID for the second task 36 is determined, for example from the control register 44 or the task structure 42 (reference sign 76). Next, it is determined whether task-relating branch prediction data 40 of the second task are stored in the task structure 42 (reference sign 78). If no task-relating branch prediction data 40 are stored or only a notice is stored that no task-relating branch prediction data 40 are stored, the restoring process is terminated and the starting or continuation of the second task is executed.

If task-relating branch prediction data 40 of the second task 36 are available in the task structure 42 of the second task, it is determined whether sufficient bandwidth for restoring these data is available (reference sign 80). In case no sufficient bandwidth is available, the restoring process is terminated. In case sufficient bandwidth is available, the task-relating branch prediction data 40 are read and stored into the branch prediction history table 24 (reference sign 82). For storing the task-relating branch prediction data 40 of the second task, it is determined whether sufficient memory space for the task-relating branch prediction data 40 is available. In case no sufficient memory space is available, it is determined which data of the branch prediction history table 24 are marked and the task-relating branch prediction data 40 of the second task replace branch prediction data which are not marked.

Figure 6:
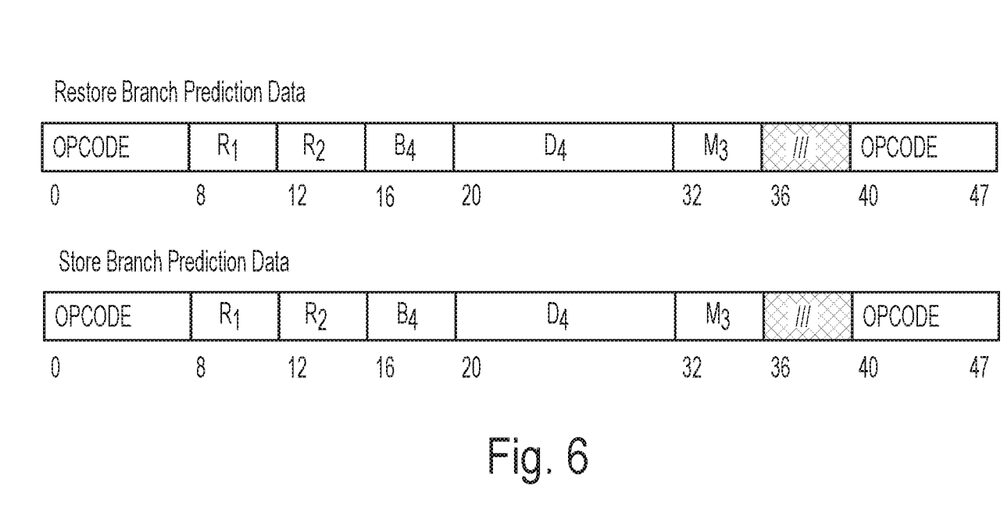
FIG. 6 shows a general view of instruction definition for storing or restoring the task-relating branch prediction data.

Referring now to FIG. 6, instructions definitions for storing and restoring the task-relating branch prediction data are described. The instructions start with a code that defined the instruction for storing or restoring. The field $R_1$ specifies a register with an identification of the task-relating branch prediction data. The field $R_2$ specifies a register with the maximum length of the branch prediction save area. The field $M_3$ specifies the mask field with the option bits for the operation, e.g. if the stored branch prediction data are cleared from the branch prediction unit. The fields $B_4$ and $D_4$ designate a base register and a displacement that form an address of the memory location for the branch prediction save area.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing tasks in a computer system comprising a processor and a memory containing program instructions, the processor being configured for executing tasks, the program instructions comprising task-relating branch instructions and task-independent branch instructions, and being configured for executing a branch prediction method for predicting the behavior of the task-relating branch instructions and the task-independent branch instructions and determining branch prediction data for the task-relating branch instructions and the task-independent branch instructions, the processor comprising a control register for controlling the tasks to be executed and a branch prediction history table for storing branch prediction data determined with the branch prediction method, the memory comprising a memory area for storing a task structure of each of the tasks, the task structure being configured for storing branch prediction data, the method comprising:

identifying the task-independent branch instructions by identifying the task-independent branch instructions as being tagged with a processor state indicating user or privileged mode or by identifying an address range of the task-independent branch instructions as the address range of standard libraries, wherein the task-independent branch instructions produce task-independent branch prediction data;

performing a first task by the processor, the first task comprising task-relating branch instructions and the task-independent branch instructions;

executing the branch prediction method, resulting in branch prediction data, including the task-independent branch prediction data produced by the task-independent branch instructions, in the branch prediction history table;

in response to determining that the first task is to be interrupted or terminated, storing task-relating branch prediction data of the first task in the task structure of the first task; and in response to determining that a second task is to be continued or started, reading task-relating branch prediction data of the second task from the task structure of the second task and storing the task-relating branch prediction data of the second task in the branch prediction history table, and ensuring that the task-independent branch prediction data produced by the task-independent branch instructions is maintained in the branch prediction history table.

2. The method of claim 1, in response to determining that the second task is to be continued or started, reading task-relating data of the second task from the task structure of the second task by the processor, the task-relating data comprising information indicating whether the task structure of the second task comprises task-relating branch prediction data, wherein only in case that the task-relating data comprises information that the task structure of the second task comprises task-relating branch prediction data performing the reading of the task-relating branch prediction data of the second task.

3. The method of claim 1, in response to determining that the first task is to be interrupted or terminated, storing task-relating data of the first task in the task structure of the first task, the task-relating data comprising information that the task structure of the first task comprises task-relating branch prediction data.

4. The method of claim 1, after storing the task-relating branch prediction data of the first ask, the method further comprising providing a marking to the task-relating branch prediction data or the task-independent branch prediction data in the branch prediction history table, the marking permitting to identify the task-independent branch prediction data that is to be maintained in the branch prediction history table.

5. The method of claim 1, wherein the storing of the task-relating branch prediction data of the second task comprising identifying task-relating branch prediction data in the branch prediction history table and replacing the identified task-relating branch prediction data in the branch prediction history table with all or part of the task-relating branch prediction data of the second task, the identifying the task-relating branch prediction data in the branch prediction history table being performed using a first marking.

6. The method of claim 1, further comprising determining whether sufficient bandwidth is available for storing the task-relating branch prediction data of the first task in the task structure of the first task and storing the task-relating branch prediction data of the first task in the task structure of the first task in case sufficient bandwidth is available and storing a notice in the task structure of the first task that no task-relating branch prediction data are stored of the first task in case no sufficient bandwidth is available.

7. The method of claim 6, in case that no sufficient bandwidth for storing the task-relating branch prediction data of the first task is available, determining task-relating branch prediction data belonging to conditional branch instructions and/or unconditional branch instructions and determining whether sufficient bandwidth is available for storing the task-relating branch prediction data of the conditional branch instructions or the unconditional branch instructions and storing only the task-relating branch prediction data of the conditional branch instructions or of the unconditional branch instructions in case sufficient bandwidth is available for storing task-relating branch prediction data of the conditional branch instructions or the unconditional branch instructions.

8. The method of claim 6, before reading the task-relating branch prediction data of the second task, determining whether the task structure of the second task comprises a notice that no task-relating branch prediction data are stored in the task structure of the second task and only reading the task-relating branch prediction data of the second task in case that no notice is available.

9. The method of claim 1, the method further comprising determining whether sufficient bandwidth is available for reading the task-relating branch prediction data of the second task from the task structure of the second task, the reading of the task-relating branch prediction data of the second task being only performed in case sufficient bandwidth is available, the reading of the task-relating branch prediction data of the second task being terminated in case no sufficient bandwidth is available.

10. A computer system having a processor and a memory, the processor being configured for executing tasks, the tasks comprising task-relating branch instructions and task-independent branch instructions, and being configured for executing a branch prediction method for predicting the behavior of the task-relating branch instructions and the task-independent branch instructions and determining branch prediction data for the task-relating branch instructions and the task-independent branch instructions;
the processor comprising a control register for controlling the tasks to be executed and a branch prediction history table for storing branch prediction data determined with the branch prediction method;
the memory comprising a memory area for storing a task structure of each of the tasks, the task structure being configured for storing branch prediction data;
the processor is configured to:
identify the task-independent branch instructions by identifying the task-independent branch instructions as being tagged with a processor state indicating user or privileged mode or by identifying an address range of the task-independent branch instructions as the address range of standard libraries, wherein the task-independent branch instructions produce task-independent branch prediction data;
perform a first task by the processor, the first task comprising task-relating branch instructions and the task-independent branch instructions;
execute the branch prediction method, resulting in branch prediction data, including the task-independent branch prediction data produced by the task independent branch instructions in the branch prediction history table;
in response to determining that the first task is to be interrupted or terminated, store task-relating branch prediction data of the first task in the task structure of the first task; and
in response to determining that a second task is to be continued or started, read task-relating branch prediction data of the second task from the task structure of the second task, store the task-relating branch prediction data of the second task in the branch prediction history table, and ensure that the task-independent branch prediction data produced by the task-independent branch instructions is maintained in the branch prediction history table.

11. The computer system of claim 10, wherein in response to determining that the second task is to be continued or started the processor is further configured to read task-relating data of the second task from the task structure of the second task by the processor, the task-relating data comprising information indicating whether the task structure of the second task comprises task-relating branch prediction data, wherein only in case that the task-relating data comprises information that the task structure of the second task comprises task-relating branch prediction data performing the reading of the task-relating branch prediction data of the second task.

12. The computer system of claim 10, wherein in response to determining that the first task is to be interrupted or terminated the processor is further configured to store task-relating data of the first task in the task structure of the first task, the task-relating data of the first task comprising information that the task structure of the first task comprises task-relating branch prediction data.

13. The computer system of claim 10, wherein after storing the task-relating branch prediction data of the first ask the processor is further configured to provide a marking to the task-relating branch prediction data or the task-independent branch prediction data in the branch prediction history table, the marking permitting to identify the task-independent branch prediction data that is to be maintained in the branch prediction history table.

14. The computer system of claim 10, wherein the processor is further configured to identify task-relating branch prediction data in the branch prediction history table and replace the identified task-relating branch prediction data in the branch prediction history table with the task-relating branch prediction data of the second task, wherein identifying the identified task-relating branch prediction data in the branch prediction history table is performed using a first marking.

15. The computer system of claim 10, wherein the processor is further configured determine whether sufficient bandwidth is available for storing the task-relating branch prediction data of the first task in the task structure of the first task and storing the task-relating branch prediction data of the first task in the task structure of the first task in case sufficient bandwidth is available and storing a notice in the task structure of the first task that no task-relating branch prediction data are stored of the first task in case no sufficient bandwidth is available.

16. The computer system of claim 15, wherein in case that no sufficient bandwidth for storing the task-relating branch prediction data of the first task is available the processor is further configured to determine task-relating branch prediction data belonging to conditional branch instructions or unconditional branch instructions and determine whether sufficient bandwidth is available for storing the task-relating branch prediction data of the conditional branch instructions or the unconditional branch instructions and store only the task-relating branch prediction data of the conditional branch instructions or of the unconditional branch instructions in case sufficient bandwidth is available for storing task-relating branch prediction data of the conditional branch instructions or the unconditional branch instructions.

17. The computer system of claim 15, wherein before reading the task-relating branch prediction data of the second task the processor is further configured to determine whether the task structure of the second task comprises a notice that no task-relating branch prediction data are stored in the task structure of the second task and only reading the task-relating branch prediction data of the second task in case that no notice is available.

18. The computer system of claim 10, wherein the processor is further configured to determine whether sufficient bandwidth is available for reading the task-relating branch prediction data of the second task from the task structure of the second task, the reading of the task-relating branch prediction data of the second task being only performed in case sufficient bandwidth is available, the reading of the task-relating branch prediction data of the second task being terminated in case no sufficient bandwidth is available.

19. A computer program product, in particular a non-transitory computer readable storage medium, the computer program product carrying computer executable code for execution by a processor controlling an apparatus, wherein execution of the instructions cause the processor to execute a method according to claim 1.

20. The computer system of claim 10, wherein the processor is further configured to provide a first marking to the task-relating branch prediction data of the second task in the branch prediction history table, the first marking indicating that the task-independent branch prediction data produced by the task-independent branch instructions is exempt from replacement in the branch prediction history table while the second task is executing.

* * * * *